United States Patent [19]
Brogardh et al.

[11] 4,446,366
[45] May 1, 1984

[54] FIBER OPTIC MEASURING DEVICE WITH COMPENSATION FOR REFLECTIONS IN THE FIBER OPTIC AND WITH A POSSIBILITY OF SIMULTANEOUS MEASUREMENT OF SEVERAL QUANTITIES

[75] Inventors: Torgny Brogårdh; Christer Ovren; Lars Sander, all of Västerås, Sweden

[73] Assignee: ASEA Aktiebolag, Västerås, Sweden

[21] Appl. No.: 306,350

[22] Filed: Sep. 28, 1981

[30] Foreign Application Priority Data

Sep. 30, 1980 [SE] Sweden .................................. 8006827

[51] Int. Cl.$^3$ .............................................. G02B 5/14
[52] U.S. Cl. ...................................... 250/227; 250/226
[58] Field of Search ............ 250/227, 226, 345, 231 R; 350/96.15; 356/418

[56] References Cited
U.S. PATENT DOCUMENTS

| 3,744,918 | 7/1973 | Jacobsson | 250/226 |
| 3,965,356 | 6/1976 | Howarth | 250/226 |
| 3,979,589 | 9/1976 | Sternberg et al. | 250/345 |
| 4,281,245 | 7/1981 | Brogardh et al. | 250/227 |

Primary Examiner—David C. Nelms
Assistant Examiner—J. Brophy
Attorney, Agent, or Firm—Watson, Cole, Grindle & Watson

[57] ABSTRACT

The invention relates to a fiber optic measuring device for measuring physical and chemical quantities. Sensors positioned in the ray path influence the spectral composition of the light in dependence on the quantity to be measured. The sensors are of a material with an absorption edge or one or more filters of interference type.

15 Claims, 31 Drawing Figures

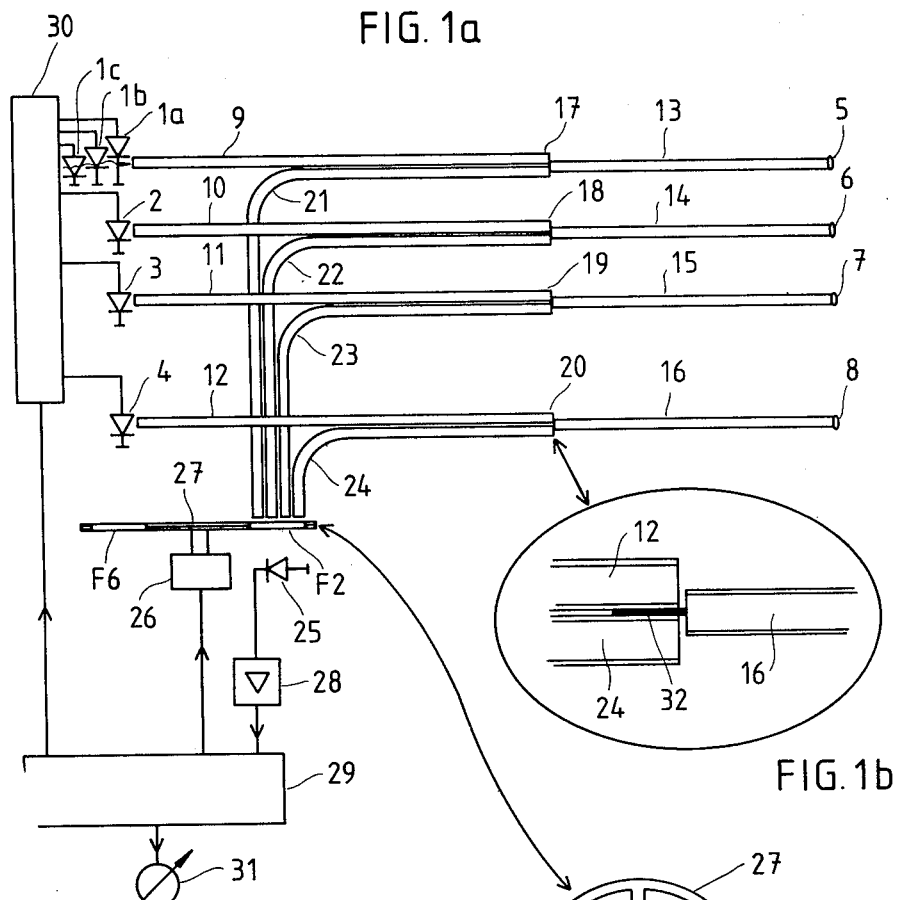
FIG. 1a
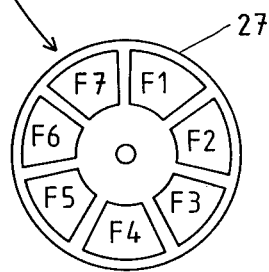
FIG. 1b
FIG. 1c

FIG.10
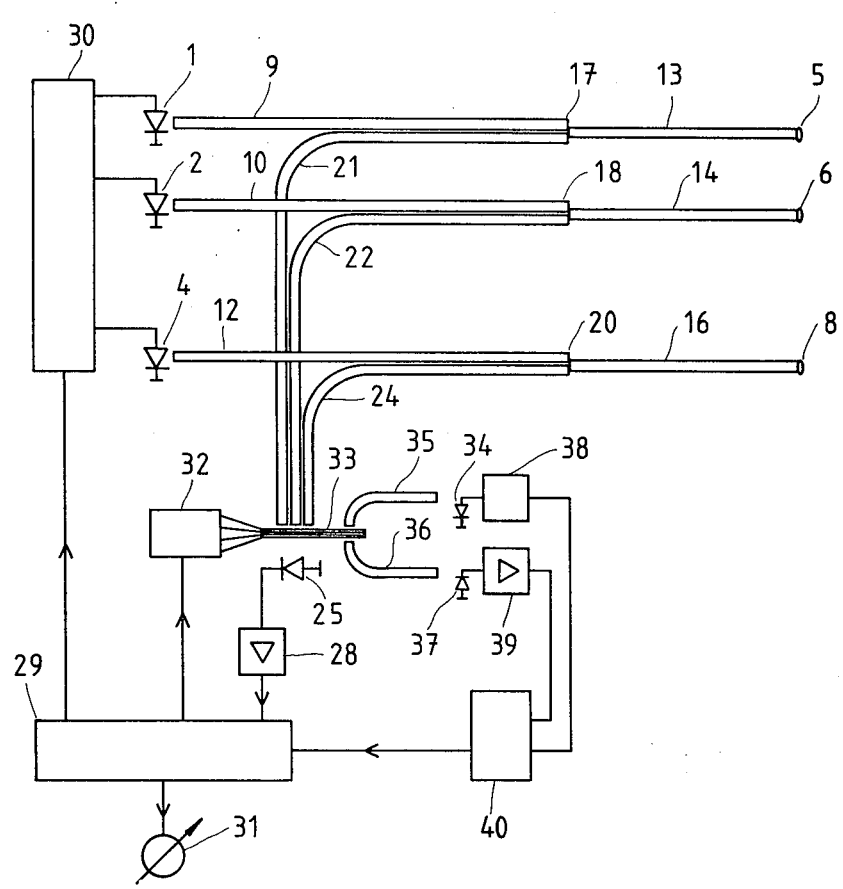
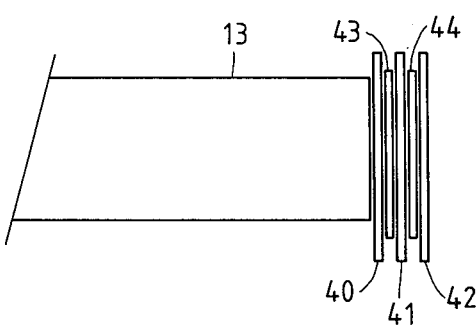
FIG.12

FIBER OPTIC MEASURING DEVICE WITH COMPENSATION FOR REFLECTIONS IN THE FIBER OPTIC AND WITH A POSSIBILITY OF SIMULTANEOUS MEASUREMENT OF SEVERAL QUANTITIES

TECHNICAL FIELD

The present invention relates to a fiber optic measuring device for measuring physical and/or chemical quantities, comprising at least one measuring transducer, which is connected by means of at least one light conducting fiber to an evaluating electronic unit comprising at least one source of incident light, at least one photo-detector and an optical coupling device for coupling incident light into the light fiber and coupling out light from the light fiber to the photo-detector, said measuring transducer being adapted to influence the spectral composition of the incident light in such a manner that the light entering the light fiber from the transducer has a spectrum dependent on the quantity to be measured, which spectrum is analyzed by means of optical filter means in the ray path between the light fiber and the photo-detector.

Throughout this specification the references to "light" should be taken to include wavelengths just outside the visible spectrum as well as wavelengths within the visible spectrum.

DISCUSSION OF PRIOR ART

A significant problem which exists with fiber optic measuring systems having a single light conducting fiber between the measuring electronic equipment and the transducer is the light reflections occurring at joints and branches of the optic fiber. These reflections influence the calibration of the measuring device, so that, a change of the reflection in, for example, a fiber connection will give rise to a measurement error.

STATEMENT OF INVENTION

The present invention solves the above-mentioned problem and other problems associated therewith and relates to a measuring device which has a built-in compensation for reflections and other light losses in the entire fiber optic system. The invention is characterised in that the measuring transducer has a reflection, transmission and/or absorption spectrum (i.e. a response spectrum) which within the emission spectrum of the incident light source gives rise to an emitted light spectrum which is dependent on the quantity to be measured which emitted light spectrum emanates from the measuring transducer and in at least one wavelength interval of the emission spectrum of the incident light source has a dependence on the quantity to be measured, which is not identical with the corresponding dependence in at least one other non-identical wavelength interval of the emission spectrum of the incident light source, and that said optical filter means has reflection, transmission and/or absorption spectra (i.e. filtering spectra) which divide the emitted spectrum emanating from the transducer into at least three non-identical wavelength intervals, which can overlap, and that said photo-detector is arranged to measure the emitted light after filtering and generate detector signals in the respective wavelength interval, and that the evaluation electronic unit comprises a device for multiplication of the detector signals by constants which include the constant unity, for difference formation between the detector signals which have been multiplied by said constants, and for quotient formation between these difference signals, and that the measuring transducer consists of a material with an optical absorption edge which within at least one wavelength interval coincides with the emission spectrum and that the dependence of the response spectrum of the measuring transducer on the quantity to be measured involves wavelength displacement and/or a deformation of the absorption edge, or that said measuring transducer consists of at least one filter of interference type having transmission or reflection spectra which vary with the quantity to be measured within said emission spectrum.

BRIEF DESCRIPTION OF DRAWINGS

The invention will be described in greater detail, by way of example, with reference to the accompanying drawings, in which:

FIG. 1a shows one embodiment of measuring device according to the invention for the simultaneous measurement of several quantities using several optical transducers, FIGS. 1b and 1c show details of the device of FIG. 1a, FIGS. 2a, 2b and 2c show the spectral relationships occurring in the measuring device of FIG. 1a, FIGS. 3a, 3b, 3c; 4a, 4b, 4c; 5a, 5b; 6a, 6b, 6c; 7a, 7b and 7c show the spectral relationships of FIGS. 2a, 2b and 2c in greater detail for various sources, measuring transducers and filters, FIG. 10 shows a modified measuring device according to the invention with an electronically controlled filter, FIG. 12 shows a measuring transducer which gives a spectrum according to FIG. 11b.

FIG. 1a shows one embodiment of a measuring device for simultaneous measurement with several fiber optic coupled measuring transducers according to the invention. Since the function of the measuring device is based on spectral analysis, a detailed illustration of the spectral relationships in the measuring device is given in the FIGS. 2a to 7c.

DESCRIPTION OF SPECIFIC EMBODIMENTS

Figure 2A:
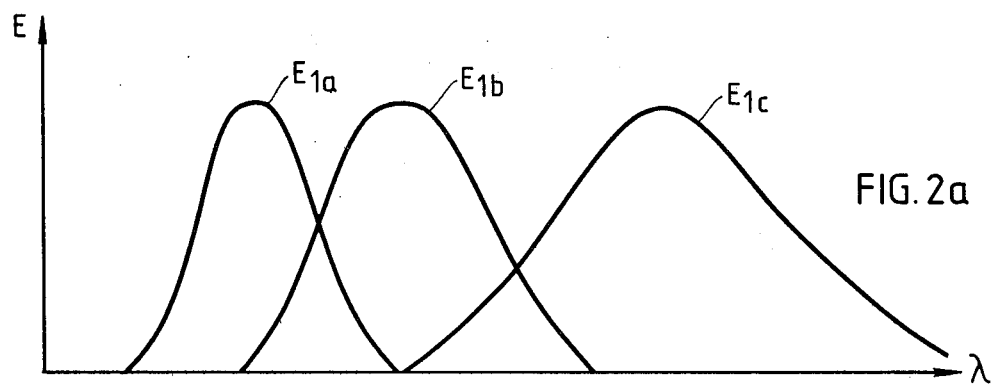

FIG. 1a shows a measuring device which employs several measuring transducers 5, 6, 7 and 8. Light-emitting diodes or laser diodes 1, 2, 3 and 4 are optically coupled to the measuring transducers 5, 6, 7 and 8 via light conductors 9, 10, 11, 12 and 13, 14, 15, 16, respectively, and combined branch and contact devices 17, 18, 19 and 20. The light returning from the measuring transducers, after passage through the light conductors 13, 14, 15 and 16 and the branch and contact devices 17, 18, 19 and 20, is passed to a common photo-diode 25. Between the end surfaces of the light conductors 21–24 and the photo-diode 25 there are a plurality of optical filters, which are mechanically replaceable. According to FIG. 1, filter replacement takes place by a motor 26 rotating a wheel 27 with six optical filters, F1-F6, and a grey filter F7, as is shown in FIG. 1c. To distinguish between the optical signals emanating from the different measuring transducers, the light sources 1-4 are time-division multiplexed or frequency-division multiplexed. In the case of time division multiplexing, one or several scannings of the light sources can be performed upon each filter replacement at the detector. Alternatively, any number of filter replacements can be performed in the time allotted to each light source. The appropriate method is desirably determined to give the most rapid multiplexing operation, and the control of the multiplexing is carried out by a unit 29 (which may be a microprocessor with its associated electronic equipment). The unit 29 is also responsive for signal processing and for the generation of the measured values supplied to an instrument 31. A device 30 in FIG. 1a comprises drive circuits and temperature regulators for the light sources 1-4. The combined branch and joining devices are shown enlarged in FIG. 1b. An opaque screen 32 between the light conductors 12 and 24 acts partly as a positioning means for the end of the light conductor 16 and partly as a light barrier between the conductors 12 and 24 to minimize inter-fiber reflections.

Figure 2B:
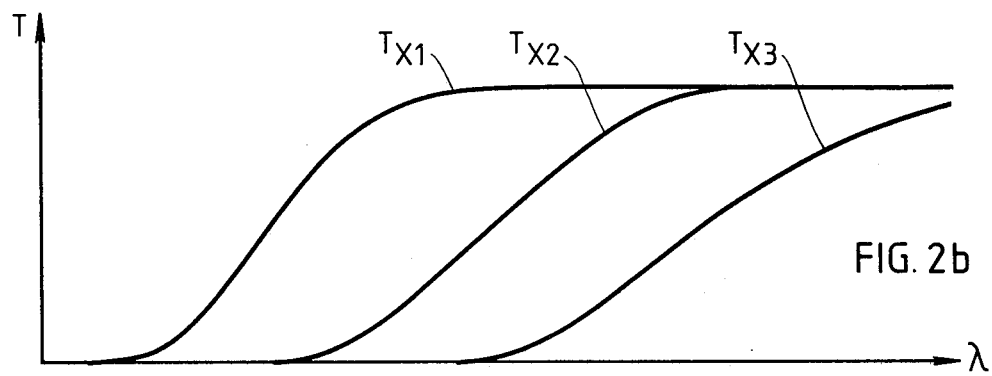
Figure 2C:
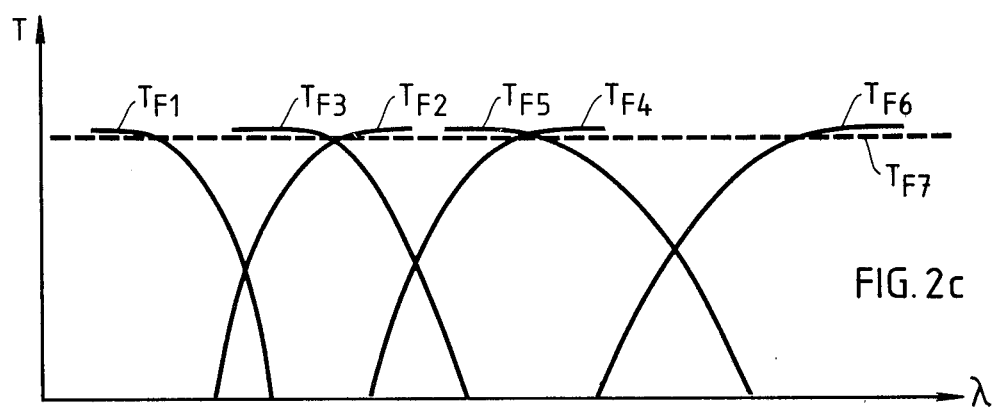

FIGS. 2a, 2b and 2c show one example of the spectral curves employed in the optical system of the device of FIG. 1a when the measuring transducers (or sensors) operate on the basis of absorption edge displacement. If this displacement is greater than the width of the emission spectrum of a single light source, several light sources with overlapping emission spectra must be used, in the manner shown in FIG. 2a. When the quantity being measured assumes a value X1, the light emitted from the respective transducer will be influenced by the transmission curve $T_{X1}$, according to FIG. 2b, in which case the emission spectrum $E_{1a}$ and the filters F1 and F2 in the filter wheel 27 are used. The transmission curves for the filters F1 and F2 are shown in FIG. 2c as $T_{F1}$ and $T_{F2}$. In a corresponding manner, the electronic unit 29 controls the light sources and the filter wheel 27 in such a way that, at the measured value X2, the emisson spectrum $E_{1b}$ and the filter $T_{F3}$ and $T_{F4}$ are used. For X3, thus, $E_{1c}$, $T_{X3}$, $T_{F5}$ and $T_{F6}$ are used. In all cases the grey filter $T_{F7}$ is also used. As $E_{1a}$-$E_{1c}$ emit with increasing wavelength sequence, 1a can be made transparent to 1b, which can be made transparent to 1c.

Figure 3A:
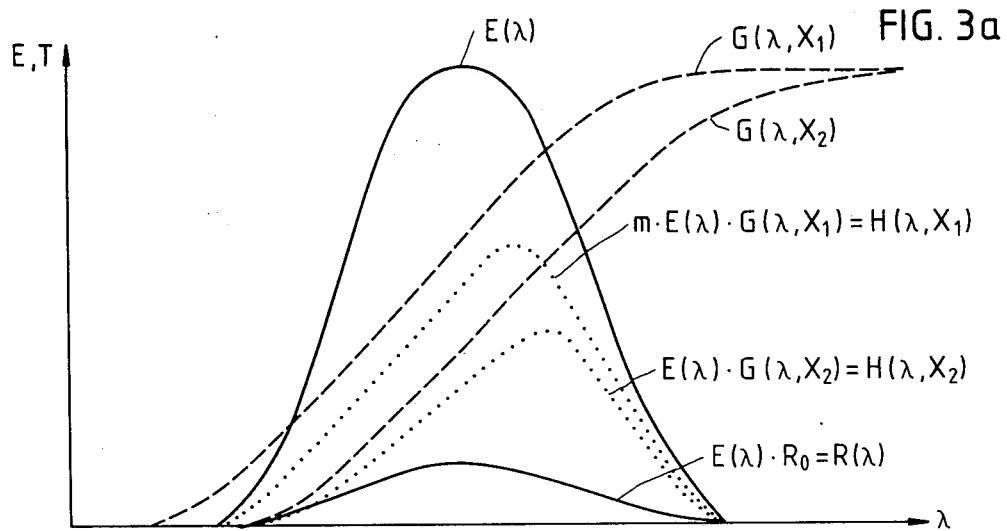
Figure 3B:
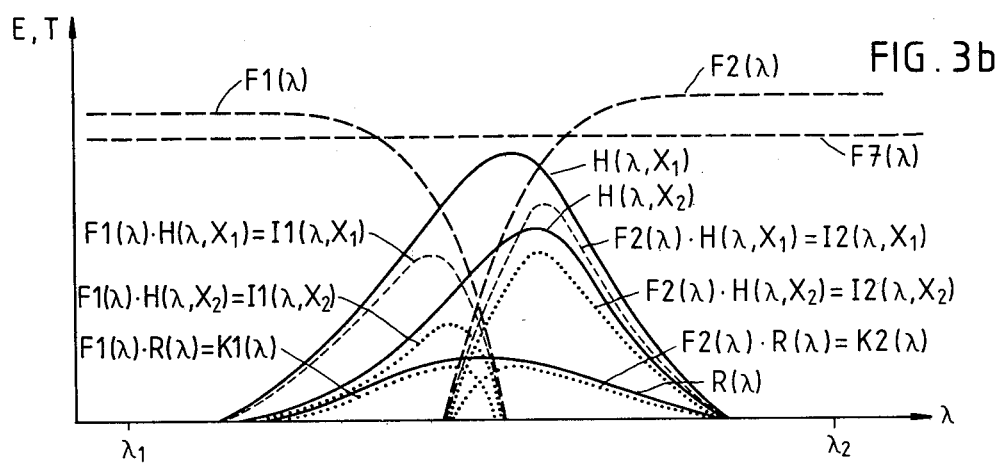
Figure 3C:
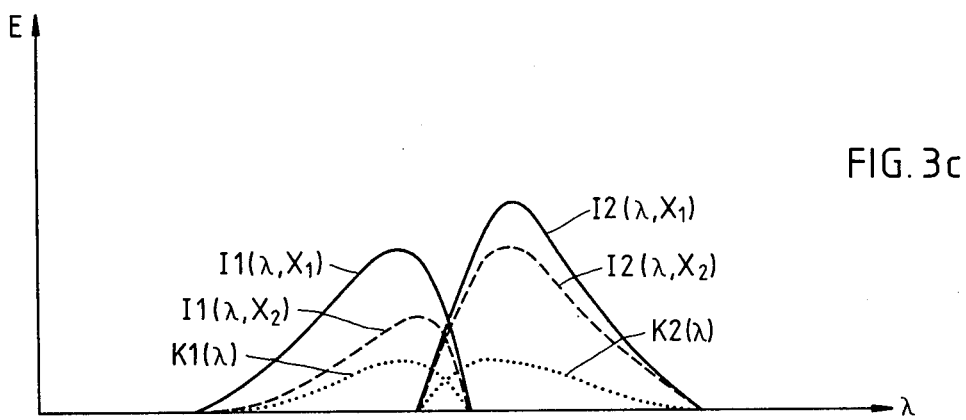

The spectral curves in FIGS. 2a, 2b and 2c describe the choice of measurement ranges as well as the method of compensation for reflections and optical losses in the fibers. In the following FIGS. 3a to 7c, only the method of compensation for reflections and fiber attenuations is considered. FIGS. 3a to 3c show this for just one of the measurement ranges of FIGS. 2a to 2c, to avoid excessive complication of these Figures.

The following spectral curves are shown in FIGS. 3a, 3b and 3c:

$E(\lambda)$: The emission spectrum of the respective light source.

$G(\lambda, X_1)$: The reflection spectrum of the respective measuring transducer, including ray path losses, at the measured value $X_1$.

m: The total fiber damping.

$H(\lambda, X_1)$: The light from the measuring transducer at the detector but before the filter, at the measured value $X_1$.

$R(\lambda)$: The light from reflections at the detector, but before a filter.

$F1(\lambda)$: The transmission spectrum for the filter F1.

$F2(\lambda)$: The transmission spectrum for the filter F2.

$I1(\lambda, X_1)$: The light from the respective measuring transducer at the detector after passage through filter F1, at the measured value $X_1$.

$I2(\lambda, X_1)$: The light from the respective measuring transducer at the detector after passage through filter F2, at the measured value $X_1$.

$K1(\lambda)$: The light from reflections at the detector after passage through filter F1.

$K2(\lambda)$: The light from reflections at the detector after passage through filter F2.

The task of the electronic unit 29 is to calculate the value of $X_1$, which is independent of reflections $R(\lambda)$ and fibre damping, etc. To do this the electronic unit has the following detector signals at its disposal:

S1: detector signal after transmission through the filter F1.

S2: detector signal after transmission through the filter F2.

S7: detector signal after transmission through the grey filter F7, where $F7(\lambda)=g$.

If we assume that the sensitivity spectrum of the detector is $D(\lambda)$, the following relationships are obtained:

$$S1 = \int_0^\infty D(\lambda) \cdot [I1(\lambda, X_1) + K1(\lambda)] d\lambda$$

$$S2 = \int_0^\infty D(\lambda) \cdot [I2(\lambda, X_1) + K2(\lambda)] d\lambda$$

$$S7 = \int_0^\infty D(\lambda) \cdot g \cdot [H(\lambda, X_1) + R(\lambda)] d\lambda$$

If $D(\lambda) = d$ is set within the interval $(\lambda_1, \lambda_2)$ the following relationships apply:

$$S1 = d \int_{\lambda_1}^{\lambda_2} I1(\lambda, X_1) d\lambda + d \int_{\lambda_1}^{\lambda_2} K1(\lambda) d\lambda$$

$$S2 = d \int_{\lambda_1}^{\lambda_2} I2(\lambda, X_1) d\lambda + d \int_{\lambda_1}^{\lambda_2} K2(\lambda) d\lambda$$

$$S7 = d \cdot g \cdot \int_{\lambda_1}^{\lambda_2} H(\lambda, X_1) d\lambda + d \cdot g \cdot \int_{\lambda_1}^{\lambda_2} R(\lambda) d\lambda$$

From the above, the following relationship which is insensitive to reflections and fiber damping is obtained:

$$S(X_1) = \frac{S1 - \alpha S2}{S7 - \beta S2} \qquad \text{(see FIGS. 3a-3c)}$$

This is shown according to the following:

$$S(X_1) = \frac{\int_{\lambda_1}^{\lambda_2} I1(\lambda, X_1) d\lambda - \alpha \int_{\lambda_1}^{\lambda_2} I2(\lambda, X_1) d\lambda + \int_{\lambda_1}^{\lambda_2} K1(\lambda) d\lambda - \alpha \int_{\lambda_1}^{\lambda_2} K2(\lambda) d\lambda}{g \int_{\lambda_1}^{\lambda_2} H(\lambda, X_1) d\lambda - \beta \int_{\lambda_1}^{\lambda_2} I2(\lambda, X_1) d\lambda + g \int_{\lambda_1}^{\lambda_2} R(\lambda) d\lambda - \beta \int_{\lambda_1}^{\lambda_2} K2(\lambda) d\lambda}$$

$\alpha$ and $\beta$ are chosen as follows:

$$\alpha = \frac{\int_{\lambda_1}^{\lambda_2} K1(\lambda)d\lambda}{\int_{\lambda_1}^{\lambda_2} K2(\lambda)d\lambda} \quad \text{and} \quad \beta = \frac{g \int_{\lambda_1}^{\lambda_2} R(\lambda)d\lambda}{\int_{\lambda_1}^{\lambda_2} K2(\lambda)d\lambda}$$

which results in $$S(X_1) = \frac{\int_{\lambda_1}^{\lambda_2} I1(\lambda, X_1)d\lambda - \alpha \int_{\lambda_1}^{\lambda_2} I2(\lambda, X_1)d\lambda}{g \int_{\lambda_1}^{\lambda_2} H(\lambda, X_1)d\lambda - \beta \int_{\lambda_1}^{\lambda_2} I2(\lambda, X_1)d\lambda}$$

an expression which is independent of $R(\lambda)$, $K1(\lambda)$ and $K2(\lambda)$.

Inserting the expressions for I1, I2 and H, the following is obtained:

$$S(X_1) = \frac{m \cdot \int_{\lambda_1}^{\lambda_2} F1(\lambda) \cdot E(\lambda) \cdot G(\lambda, X_1)d\lambda - \alpha \cdot m \int_{\lambda_1}^{\lambda_2} F2(\lambda) \cdot E(\lambda) \cdot G(\lambda, X_1) \cdot d\lambda}{m \cdot g \cdot \int_{\lambda_1}^{\lambda_2} E(\lambda) \cdot G(\lambda, X_1)d\lambda - \beta \cdot m \int_{\lambda_1}^{\lambda_2} F2(\lambda) \cdot E(\lambda) \cdot G(\lambda, X_1) \cdot d\lambda}$$

whereby the fiber damping m can be eliminated. Thus $S(X_1)$ can be expressed as:

$$S(X_1) = \frac{S2 - \alpha S1}{S3 - \beta S1} \quad \text{(see FIGS. 4a–4c)}$$

$$S(X_1) = \frac{d \int_{\lambda_1}^{\lambda_2} m \cdot F2(\lambda) \cdot G(\lambda, X_1) \cdot E(\lambda)d\lambda + d \int_{\lambda_1}^{\lambda_2} F2(\lambda) \cdot Ro \cdot E(\lambda)d\lambda - \alpha \cdot d \cdot Ro \int_{\lambda_1}^{\lambda_2} F1(\lambda) \cdot E'(\lambda)d\lambda}{d \int_{\lambda_1}^{\lambda_2} m \cdot F3(\lambda) \cdot G(\lambda, X_1) \cdot E(\lambda)d\lambda + d \int_{\lambda_1}^{\lambda_2} F3(\lambda) \cdot Ro \cdot E(\lambda)d\lambda - \beta \cdot d \cdot Ro \int_{\lambda_1}^{\lambda_2} F1(\lambda) \cdot E'(\lambda)d\lambda}$$

$$S(X_1) = \frac{A(X_1) - B(X_1)}{C(X_1) - B(X_1)}$$

which is a soluble expression provided that $A(X_1) \neq C(X_1)$ for all occurrences of $X_1$, which is also the case with a suitable choice of $F1(\lambda)$.

The fact that $\alpha$ and $\beta$ are independent of fiber damping and the magnitudes of the reflections and therefore only have to be adjusted once for a given measuring device is shown according to the following:

$$\alpha = \frac{Ro \int_{\lambda_1}^{\lambda_2} F1(\lambda) \cdot E(\lambda) \cdot d\lambda}{Ro \int_{\lambda_1}^{\lambda_2} F2(\lambda) \cdot E(\lambda) \cdot d\lambda}$$

$$\beta = \frac{Ro \int_{\lambda_1}^{\lambda_2} E(\lambda)d\lambda}{Ro \int_{\lambda_1}^{\lambda_2} F2(\lambda) \cdot E(\lambda)d\lambda}$$

Since Ro, which is the reflection capacity of the optical system, can be eliminated, $\alpha$ and $\beta$ are only dependent on $F1(\lambda)$, $F2(\lambda)$ and $E(\lambda)$. This, as well as the above expression for $S(X_1)$, shows further that both the spectra of the light source and of the measuring transducer, $E(\lambda)$ and $G(\lambda, X_1)$, respectively, can be multiplied by a constant without influencing $S(X_1)$, $\alpha$ and $\beta$. The only thing that has to be stabilized in the measuring device is thus the temperature of the light source as well as $F1(\lambda)$ and $E(\lambda)$. The latter may be made stable by temperature regulation.

Figure 4A:
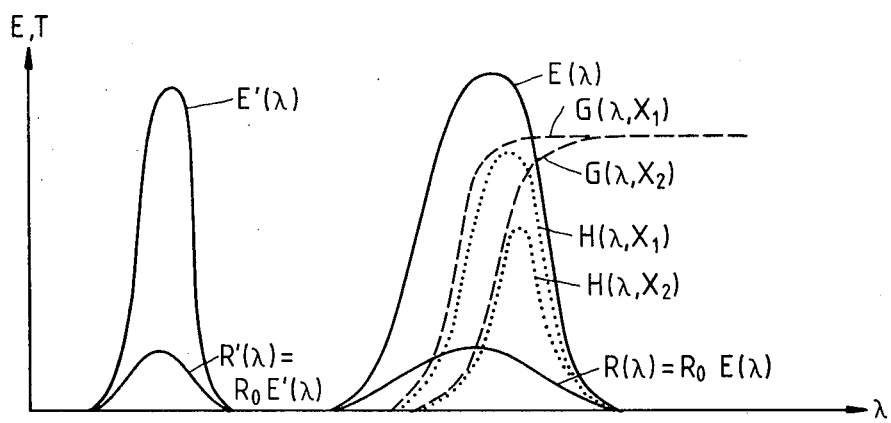
Figure 4B:
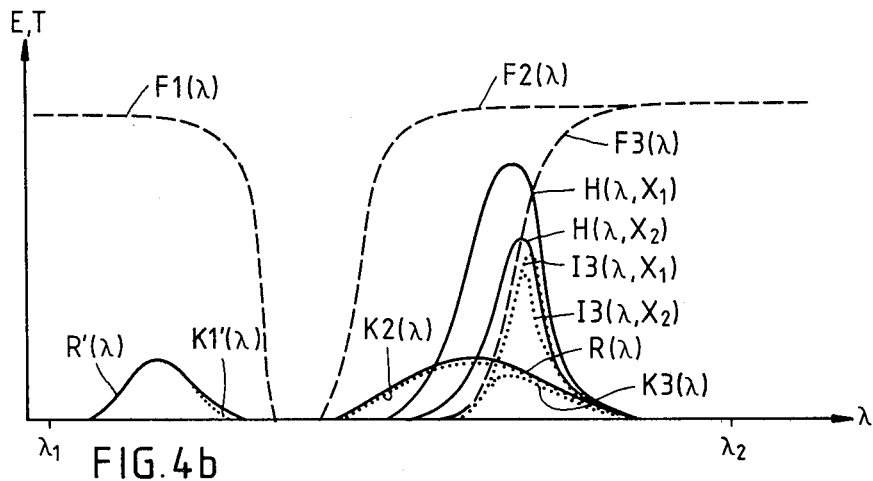
Figure 4C:
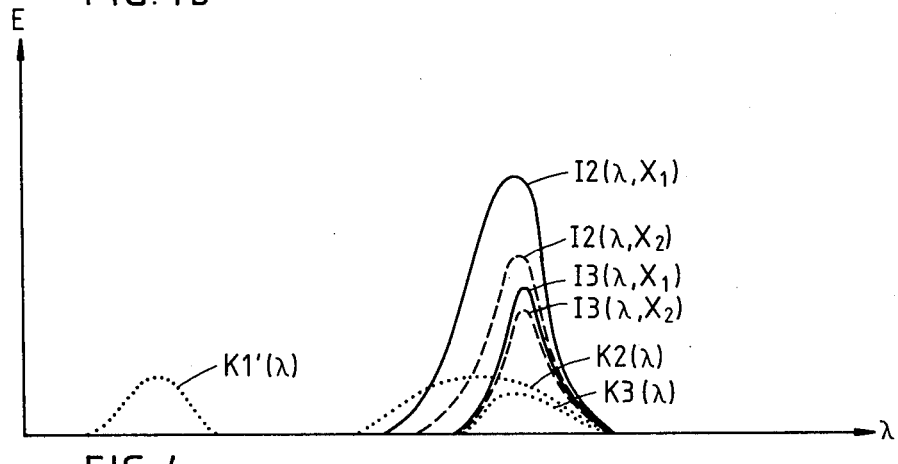
Figure 5A:
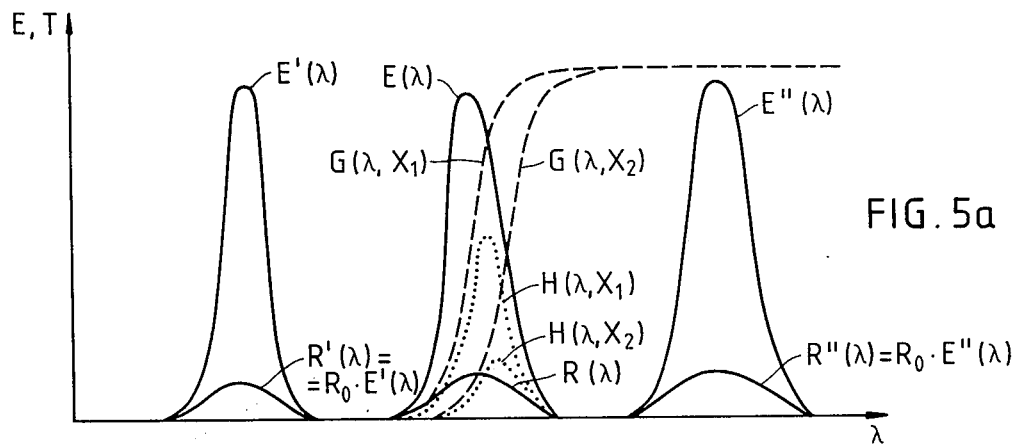
Figure 5B:
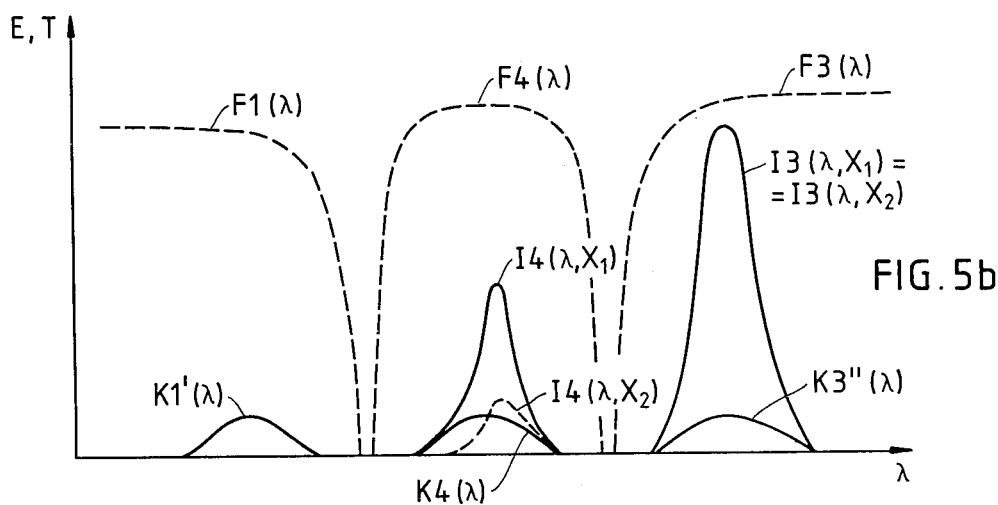

A number of embodiments are possible for the spectral relationships in the optical section of the measuring device. If the emission spectrum of the light source consists of two emission peaks $E(\lambda)$ and $E'(\lambda)$, as shown in FIGS. 4a, 4b and 4c, the method of compensating for the reflections will be simpler to understand. Using the designations employed in FIGS. 3a, 3b and 3c, the following is obtained:

$$S1 = d \cdot \int_{\lambda_1}^{\lambda_2} K1'(\lambda)d\lambda = d \cdot Ro \cdot \int_{\lambda_1}^{\lambda_2} F1(\lambda) \cdot E'(\lambda)d\lambda$$

$$S2 = d \cdot \int_{\lambda_1}^{\lambda_2} I2(\lambda, X_1)d\lambda + d \cdot \int_{\lambda_1}^{\lambda_2} K2(\lambda)d\lambda$$

$$S3 = d \cdot \int_{\lambda_1}^{\lambda_2} I3(\lambda, X_1)d\lambda + d \cdot \int_{\lambda_1}^{\lambda_2} K3(\lambda)d\lambda$$

Selecting

If $F2(\lambda) = 1$ within $E(\lambda)$'s spectrum and $F1(\lambda) = 1$ within $E'(\lambda)$'s spectrum and if $$\alpha = \frac{\int_{\lambda_1}^{\lambda_2} E(\lambda)d\lambda}{\int_{\lambda_1}^{\lambda_2} E'(\lambda)d\lambda} \quad \text{and} \quad \beta = \frac{\int_{\lambda_1}^{\lambda_2} F3(\lambda) \cdot E(\lambda)d\lambda}{\int_{\lambda_1}^{\lambda_2} E'(\lambda)d\lambda}$$

the following is obtained $$S(X_1) = \frac{\int_{\lambda_1}^{\lambda_2} G(\lambda, X_1) \cdot E(\lambda)d\lambda}{\int_{\lambda_1}^{\lambda_2} F3(\lambda) \cdot G(\lambda, X_1) \cdot E(\lambda)d\lambda} \quad \text{i.e.}$$

$$S(X_1) = \frac{D(X_1)}{E(X_1)}$$

The only restriction here is that $D(X_1)$ must not be identical with $E(X_1)$, which is achieved with a suitable choice of $F3(\lambda)$.

A further simplification is obtained if the light source emits light with three peaks $E(\lambda)$, $E'(\lambda)$ and $E''(\lambda)$ according to FIG. 5. The following is then obtained:

$$S1 = d \int_{\lambda_1}^{\lambda_2} K1'(\lambda)d\lambda = d \cdot Ro \int_{\lambda_1}^{\lambda_2} F1(\lambda) \cdot E'(\lambda)d\lambda \approx d \cdot Ro \int_{\lambda_1}^{\lambda_2} E'(\lambda)d\lambda$$

$$S3 = d \int_{\lambda_1}^{\lambda_2} I3(\lambda, X_1)d\lambda + d \int_{\lambda_1}^{\lambda_2} K3''(\lambda)d\lambda$$

$$= d \cdot m \cdot \int_{\lambda_1}^{\lambda_2} F3(\lambda) \cdot G(\lambda, X_1) \cdot E''(\lambda)d\lambda + d \cdot Ro \int_{\lambda_1}^{\lambda_2} F3(\lambda) \cdot E''(\lambda)d\lambda$$

$$\approx d \cdot m \cdot \int_{\lambda_1}^{\lambda_2} \cdot E''(\lambda)d\lambda + d \cdot Ro \int_{\lambda_1}^{\lambda_2} E''(\lambda)d\lambda$$

$$S4 = d \int_{\lambda_1}^{\lambda_2} I4(\lambda, X_1)d\lambda + d \int_{\lambda_1}^{\lambda_2} K4(\lambda)d\lambda$$

$$= d \cdot m \int_{\lambda_1}^{\lambda_2} F4(\lambda) \cdot G(\lambda, X_1) \cdot E(\lambda)d\lambda + d \int_{\lambda_1}^{\lambda_2} F4(\lambda) \cdot R(\lambda)d\lambda$$

$$\approx d \cdot m \int_{\lambda_1}^{\lambda_2} G(\lambda, X_1) \cdot E(\lambda)d\lambda + d \cdot Ro \cdot \int_{\lambda_1}^{\lambda_2} E(\lambda)d\lambda$$

It has been assumed here that $F1(\lambda)=1$ within $E'(\lambda)$, $F4(\lambda)=1$ within $E(\lambda)$ and $F3(\lambda)=1$ within $E''(\lambda)$ and that $G(\lambda,X_1)=0$ within $E'(\lambda)$ and 1 within $E''(\lambda)$.

As measuring signal there is used:

$$S(X_1) = \frac{S4 - \alpha S1}{S3 - \beta S1} \quad \text{(see FIGS. 5a, 5b)}$$

$$S(X_1) = \frac{d \cdot m \int_{\lambda_1}^{\lambda_2} G(\lambda,X_1) \cdot E(\lambda)d\lambda + d \cdot Ro \cdot \int_{\lambda_1}^{\lambda_2} E(\lambda)d\lambda - d \cdot Ro \int_{\lambda_1}^{\lambda_2} E'(\lambda)d\lambda}{d \cdot m \int_{\lambda_1}^{\lambda_2} E''(\lambda)d\lambda + d \cdot Ro \int_{\lambda_1}^{\lambda_2} E''(\lambda)d\lambda - d \cdot Ro \int_{\lambda_1}^{\lambda_2} E'(\lambda)d\lambda}$$

or when $\int_{\lambda_1}^{\lambda_2} E(\lambda)d\lambda = \int_{\lambda_1}^{\lambda_2} E'(\lambda)d\lambda = \int_{\lambda_1}^{\lambda_2} E''(\lambda)d\lambda = E_o$ $$S(X_1) = 1/E_o \int_{\lambda_1}^{\lambda_2} G(\lambda,X_1) \cdot E(\lambda)d\lambda$$

Figure 6A:
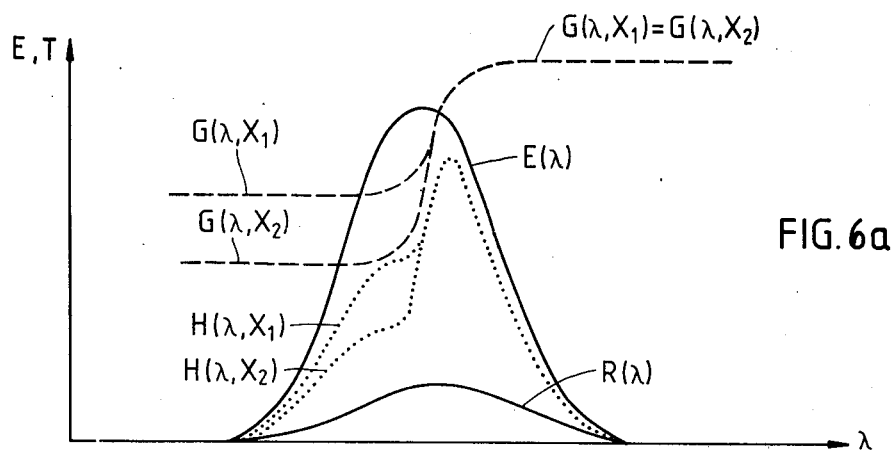
Figure 6B:
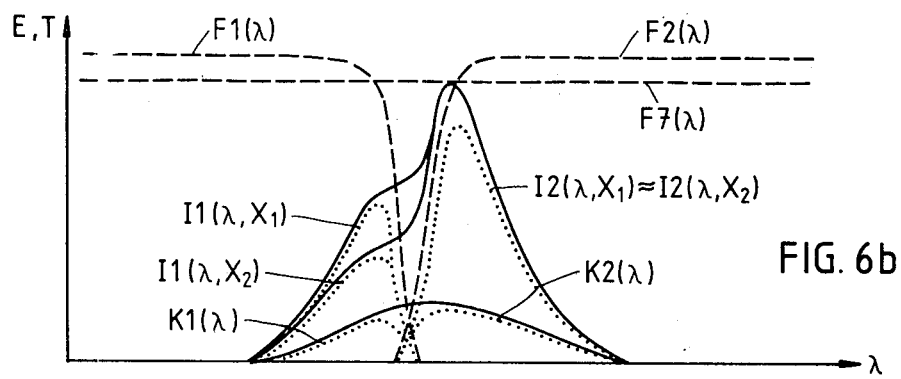
Figure 6C:
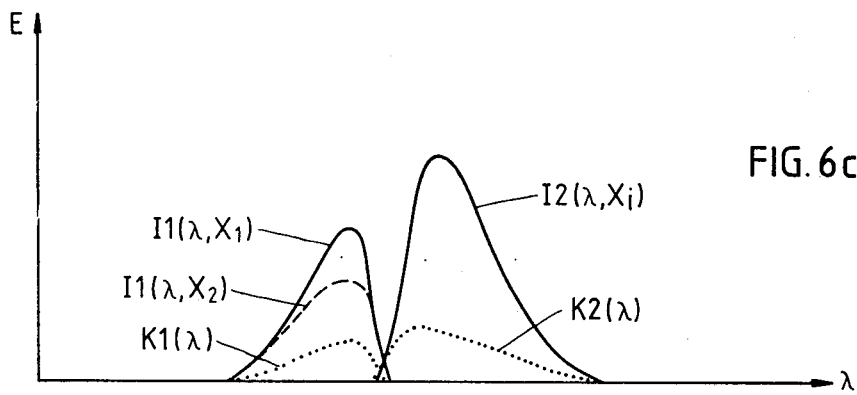

FIGS. 3a to 5b show transducer spectra which are displaced in the wavelength direction with respect to the quantity X being measured. Another type of transducer leaves part of its spectrum unaffected by the quantity being measured whereas the absorption and the reflectance are changed in another wavelength range. An example of such a transducer is the fiber optic transducer described in U.S. Pat. No. 4,281,245. FIGS. 6a to 6c show spectral curves for a measuring device with such a transducer, and the main differences between FIGS. 6a-6c and FIGS. 3a-3c reside in $G(\lambda,X_1)$. With the same definition of the quantities as for FIGS. 3a-3c, the following is selected $$S(X_1) = \frac{S1 - \alpha S2}{S7 - \beta S2} \quad \text{(see FIGS. 6a-6c)}$$

In relation to a measuring device with the spectral analysis according to FIGS. 3a-3c, S2 has here a smaller dependence on X while at the same time S1's relative dependence on X compared with S7 is greater. Generally, this provides for more favourable calculations. However, the greatest advantage in a system according to FIGS. 6a-6c is that $G(\lambda,X_1)$ cannot be displaced with respect to wavelength and thus a larger number of light sources and filters according to FIGS. 2a-2c are required for increasing the measuring range.

Figure 7A:
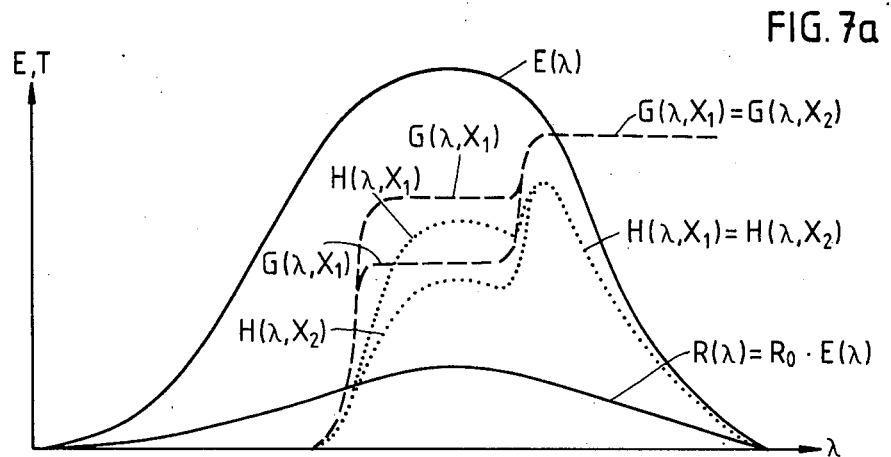
Figure 7B:
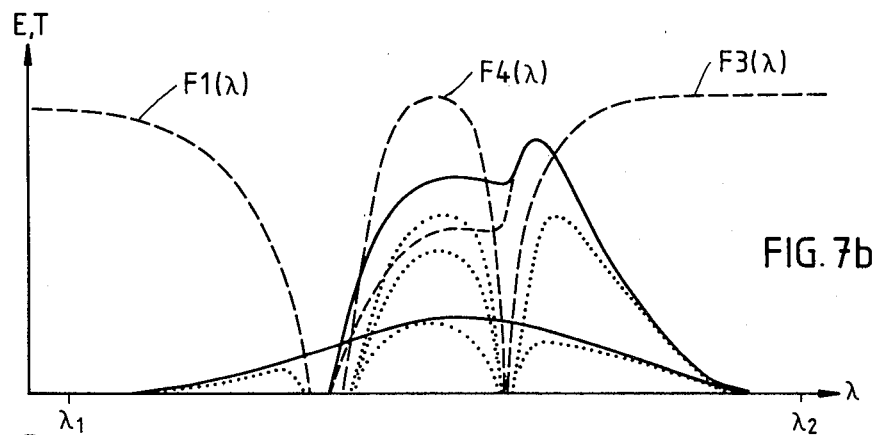
Figure 7C:
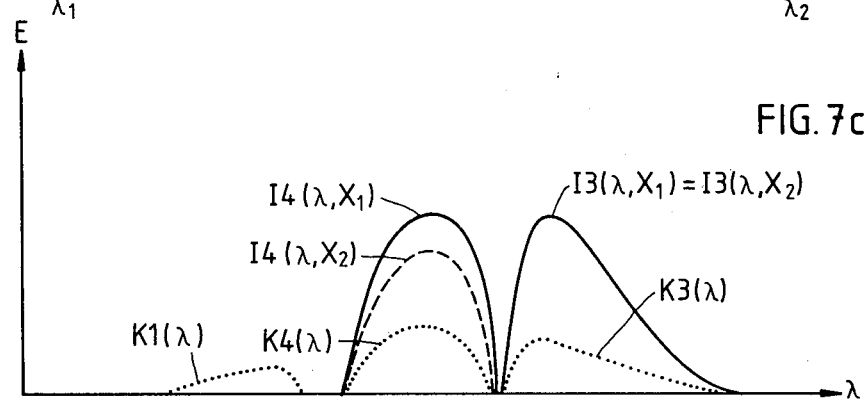

FIGS. 7a-7c show an alternative transducer spectrum to that shown in FIGS. 6a-6c. Within the spectrum $E(\lambda)$ of the light source (see FIG. 7a), the transducer spectrum has three levels, one zero level at lower values of $\lambda$, one middle level, which is dependent on the quantity being measured, at the center of $E(\lambda)$, and a level independent of the quantity being measured for higher values of $\lambda$. From FIGS. 7a-7c the following is obtained:

$$S = d \int_{\lambda_1}^{\lambda_2} K1(\lambda)d\lambda = d \cdot Ro \int_{\lambda_1}^{\lambda_2} F1(\lambda) \cdot E(\lambda)d\lambda$$

$$S3 = d \int_{\lambda_1}^{\lambda_2} I3(\lambda,X_1)d\lambda + d \int_{\lambda_1}^{\lambda_2} K3(\lambda)d\lambda$$

$$= d \cdot m \cdot \int_{\lambda_1}^{\lambda_2} F3(\lambda) \cdot G(\lambda,X_\infty) \cdot E(\lambda)d\lambda + d \cdot Ro \int_{\lambda_1}^{\lambda_2} F3(\lambda) \cdot E(\lambda)d\lambda$$

$$S4 = d \cdot \int_{\lambda_1}^{\lambda_2} I4(\lambda, X_1) d\lambda + d \cdot \int_{\lambda_1}^{\lambda_2} K4(\lambda) d\lambda$$

$$= d \cdot m \int_{\lambda_1}^{\lambda_2} F4(\lambda) \cdot G(\lambda, X_1) \cdot E(\lambda) d\lambda + d \cdot Ro \int_{\lambda_1}^{\lambda_2} F4(\lambda) \cdot E(\lambda) d\lambda$$

$$S(X_1) = \frac{S4 - \alpha S1}{S3 - \beta S1}$$

$$\alpha = \frac{\int_{\lambda_1}^{\lambda_2} F4(\lambda) \cdot E(\lambda) d\lambda}{\int_{\lambda_1}^{\lambda_2} F1(\lambda) \cdot E(\lambda) d\lambda}$$

$$\beta = \frac{\int_{\lambda_1}^{\lambda_2} F3(\lambda) \cdot E(\lambda) d\lambda}{\int_{\lambda_1}^{\lambda_2} F1(\lambda) \cdot E(\lambda) d\lambda}$$

If $G(\lambda, X_\infty) = g$, the following is obtained:

$$S(X_1) = \frac{\int_{\lambda_1}^{\lambda_2} F4(\lambda) \cdot G(\lambda, X_1) \cdot E(\lambda) d\lambda}{g \int_{\lambda_1}^{\lambda_2} F3(\lambda) \cdot E(\lambda) d\lambda}$$

Figure 8A:
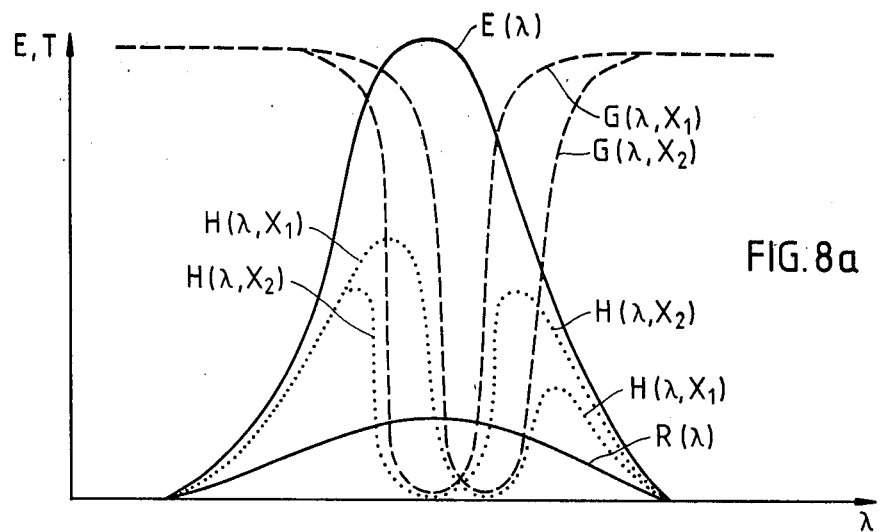
FIGS. 8a, 8b and 8c show spectral relationships similar to those in FIGS. 3a, 3b and 3c but with displacement of absorption maxima.
Figure 8B:
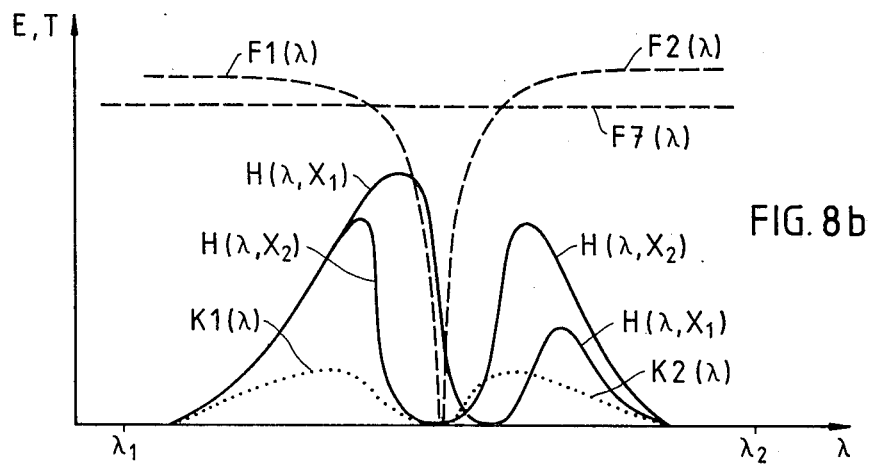
Figure 8C:
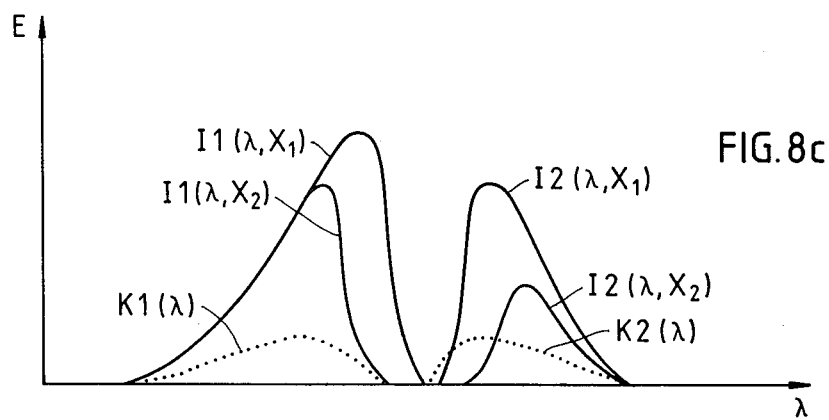

In FIGS. 3a–3c, the light from the transducer is modulated by the displacement of an absorption edge. If, instead, this modulation is performed through the displacement of an absorption maximum, as shown in FIGS. 8a–8c, twice the transducer sensitivity can be obtained. Such a spectrum may be obtained, for example, with the aid of an interference filter or a doped crystal.

Using the same definitions employed for the analysis of FIGS. 3a–3c, the following is selected:

$$S(X_1) = \frac{S1 - \alpha S2}{S7 - \beta S1} \quad \text{(see FIGS. 8a–8c)}$$

where $\alpha$ is identical with the previous value, but $$\beta = \frac{g \cdot \int_{\lambda_1}^{\lambda_2} R(\lambda) d\lambda}{\int_{\lambda_1}^{\lambda_2} K1(\lambda) d\lambda}$$

Figure 9A:
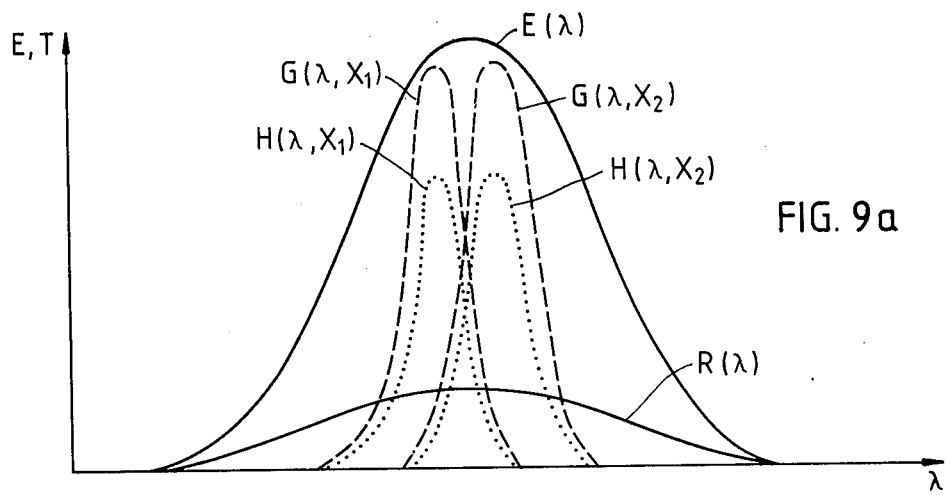
FIGS. 9a, 9b and 9c show spectral relationships with modulation of the light emitted by measuring transducers by a displacement of absorption minima.
Figure 9B:
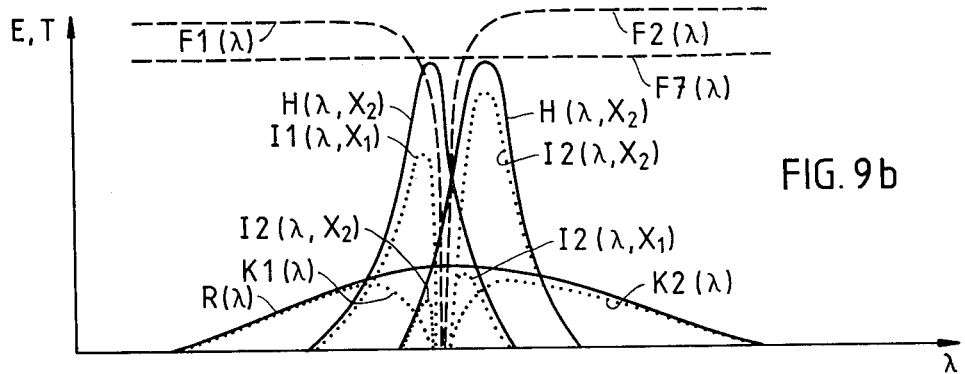
Figure 9C:
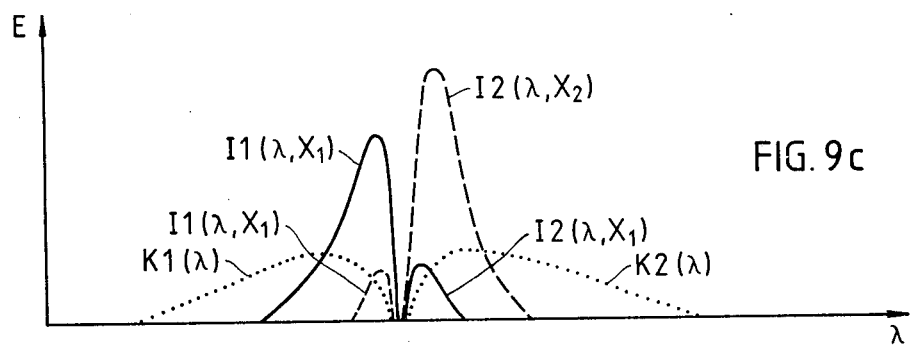

In the same way, the transducer light can be modulated by the displacement of an absorption minimum according to FIGS. 9a–9c. Here, too, the following is selected:

$$S(X_1) = \frac{S1 - \alpha S2}{S7 - \beta S1}$$

With the exception of the filter F4, the filters which have been discussed so far are of high- or low-pass type. The filter F4 is of a band pass type and, of course, filters F1–F3 could also be of a band pass type, provided, of course, the width of the bands is chosen with regard to the emission spectrum of the light source.

If only band pass filters are used, there is a possibility of using electro-optically controlled filters of the Fabry-Perot or double refraction type, in which case the motor 26 and filter wheel 27 are replaced by an electronically controlled filter according to the arrangement shown in FIG. 10. The light from the measuring transducers 5, 6, 8 is caused to pass through an electronically controlled filter 33 before passing to the detector 25. For control of the filter 33, a voltage generator 32 is provided which in this case individually controls the voltage across three layers of, for example, lithium niobate in a Fabry-Perot resonator. To be able to control the position of the band pass with great accuracy, there is provided an optical wavelength-sensitive equipment, consisting of a light source 34, a fiber 35, a fiber 36 and a photo-detector 37. The light source is driven by a driver 38, the detector signal is amplified in an amplifier 39, and the calculation of the center wavelength of the filter 33 is made in a unit 40.

Figure 11A:
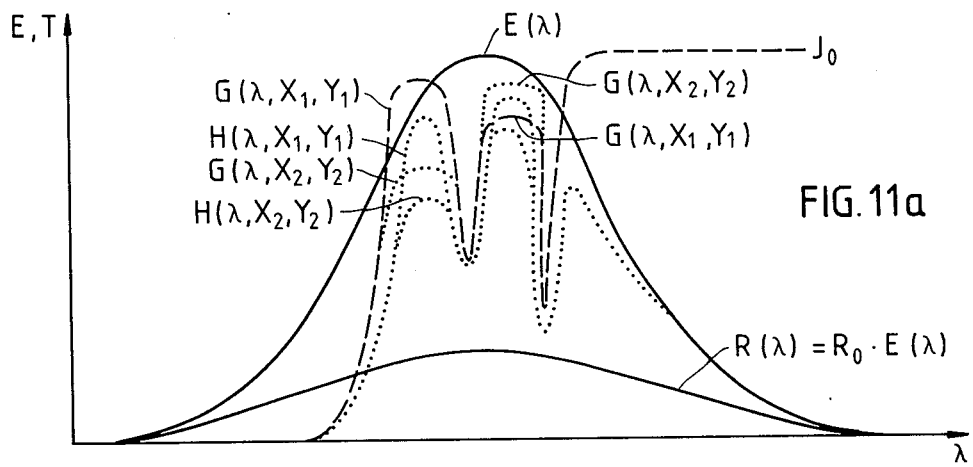
FIGS. 11a, 11b and 11c show the transducer spectrum for two separate quantities X and Y to be measured.
Figure 11B:
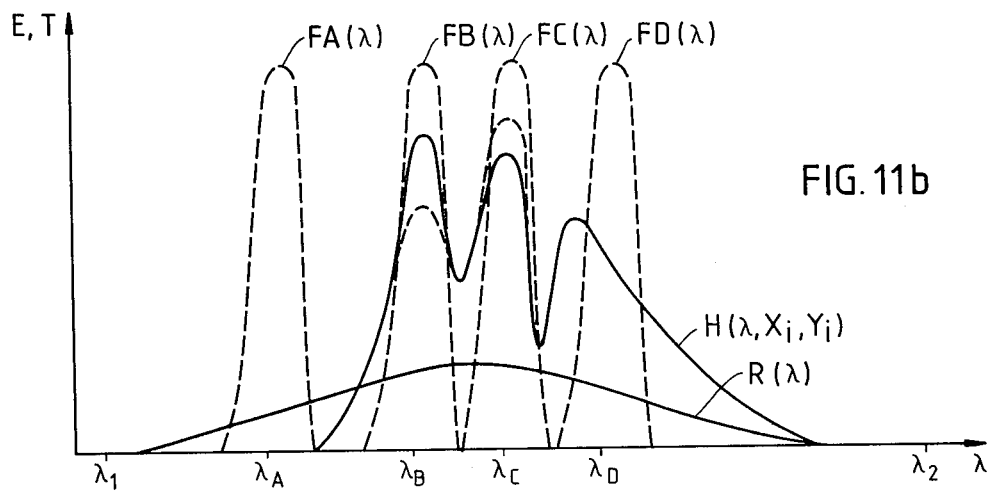
Figure 11C:
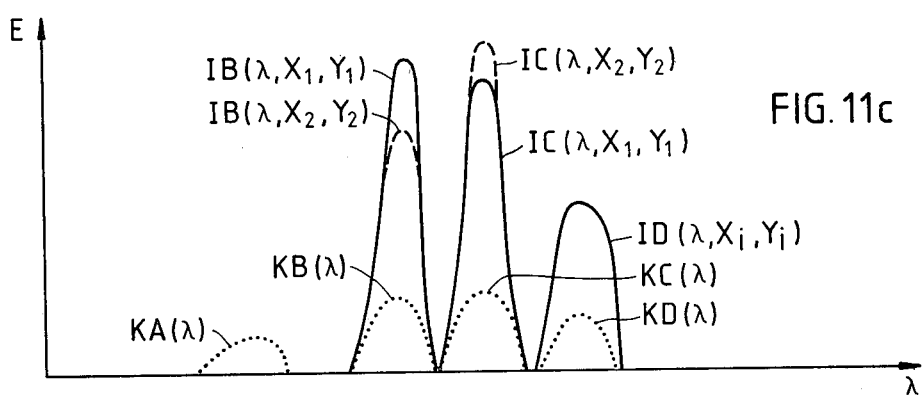

By having access to a continuously controllable band pass filter $F(\lambda, \lambda_o)$, where $\lambda_o$ is the center wavelength, the light spectrum to the detector can be analyzed in a great number of wavelength intervals. This may be of value, for example, if it is desired to transmit more than one quantity to be measured from one and the same measuring transducer. A transducer spectrum for two different quantities to be measured, X and Y, is shown in FIGS. 11a–11c. FA, FB, FC, and FD are transmission spectra of the filter 33 at four different center wavelengths, $\lambda_A$, $\lambda_B$, $\lambda_C$, $\lambda_D$. At the different center wavelengths, the detector signals are obtained:

$$S_A = d \int_{\lambda_1}^{\lambda_2} KA(\lambda) d\lambda = S_A^K$$

$$S_B = d \int_{\lambda_1}^{\lambda_2} IB(\lambda, X_1, Y_1) d\lambda + d \int_{\lambda_1}^{\lambda_2} KB(\lambda) d\lambda = S_B^I + S_B^K$$

$$S_C = d \int_{\lambda_1}^{\lambda_2} IC(\lambda, X_1, Y_1) d\lambda + d \int_{\lambda_1}^{\lambda_2} KC(\lambda) d\lambda = S_C^I + S_C^K$$

$$S_D = d \int_{\lambda_1}^{\lambda_2} ID(\lambda, X_1, Y_1) d\lambda + d \int_{\lambda_1}^{\lambda_2} KD(\lambda) d\lambda = S_D^I + S_D^K$$

Defining:

$$I_B = \frac{S_B{}^K}{S_A{}^K}\,;\, I_C = \frac{S_C{}^K}{S_A{}^K}\,;\, I_D = \frac{S_D{}^K}{S_A{}^K}$$

$I_B$, $I_C$ and $I_D$ become dependent on FA($\lambda$), FB($\lambda$), FC($\lambda$), FD($\lambda$) and E($\lambda$) and not on Ro, that is, $I_B$, $I_C$, $I_D$ may be programmed in advance into the computing electronic unit, which is thus able to obtain $S_B{}^I$, $S_C{}^I$ and $S_D{}^I$ according to:

$$S_B{}^I = S_B - I_B \cdot S_A$$

$$S_C{}^I = S_C - I_C \cdot S_A$$

$$S_D{}^I = S_D - I_D \cdot S_A$$

The detector sensitivity (d), the damping in the fiber and the emissivity (m) of the light source, is obtained from the following ($g_o$ being the transmission of the transducer at greater wavelengths):

$$S_D{}^I = d \cdot m \int_{\lambda_1}^{\lambda_2} g_o \cdot FD(\lambda) \cdot D\lambda = (\lambda) d \cdot m \cdot g_o \cdot I_D$$

$$d \cdot m = \frac{S_D{}^I}{I_D} = \frac{S_D - I_D \cdot S_A}{I_D}$$

The quantities being measured, $X_1$ and $Y_1$, are obtained from $S_B{}^I$ and $S_C{}^I$:

$$S_B{}^I = d \cdot m \int_{\lambda_1}^{\lambda_2} FB(\lambda) \cdot G(\lambda, X_1) \cdot E(\lambda) d\lambda = d \cdot m \cdot I_B$$

$$S_C{}^I = d \cdot m \int_{\lambda_1}^{\lambda_2} FC(\lambda) \cdot G(\lambda, Y_1) \cdot E(\lambda) d\lambda = d \cdot m \cdot I_C$$

The quantities being measured, $X_1$ and $Y_1$, are obtained from $I_B$ and $I_C$, respectively:

$$S(X_1) = \frac{S_B{}^I}{d \cdot m} = \frac{S_B - I_B \cdot S_A}{S_D - I_D \cdot S_A} \cdot I_D$$

$$S(Y_1) = \frac{S_C{}^I}{d \cdot m} = \frac{S_C - I_C \cdot S_A}{S_D - I_D \cdot S_A} \cdot I_D$$

By introducing more wavelength intervals, for which the transducer spectrum has a dependence on the quantity to be measured, with one quantity to be measured for each wavelength interval, more than two quantities can be measured simultaneously. The number of possible quantities to be measured is limited by the width of the emission spectrum and by how narrow the transmission spectrum of the detector filter can be made.

An example of a transducer which gives a spectrum according to FIG. 11b, is shown in FIG. 12. 40, 41 and 42 refer to interference filters with reflection peaks with the center wavelengths $\lambda_D$, $\lambda_B$ and $\lambda_C$ according to FIG. 11b. Thus, filter 40 generates $g_o$, filter 41 generates G($\lambda$,$X_1$), and filter 42 generates G($\lambda$,$Y_1$). All three filters 40, 41 and 42 transmit $\lambda_A$, around which wavelength the reflections in the optic are measured. The sensor elements 43 and 44 change their transmission around $\lambda_B$ and $\lambda_C$, respectively, in dependence on the quantities being measured, X and Y, respectively. Elements 43 and 44 may, for example, be semiconductor crystals with temperature- and pressure-dependent absorption, but where only element 44 is subjected to pressure, the measured value of the temperature may then be used to compensate the pressure value of the temperature.

The invention may be varied in many ways within the scope of the following claims.

What is claimed is:

1. A fiber optic measuring device for measuring physical and chemical quantities, comprising:
    at least one measuring transducer adapted to influence the spectral composition of incident light such that emitted light from the measuring transducer includes a spectrum having at least one wavelength interval different than another wavelength interval of the incident light, said measuring transducer including a material having an optical absorption edge within at least one wavelength interval coinciding with the spectrum of said emitted light such that the dependence of the response spectrum of the emitted light on the measured quantity induces wavelength displacement of said absorption edge;
    an evaluating electronic unit including at least one source of said incident light;
    at least one light conducting fiber interconnecting said measuring transducer and said evaluating electronic unit for transmitting said incident light from said at least one source to said measuring transducer and emitted light from said measuring transducer to said evaluating electronic unit;
    said evaluating electronic unit further including at least one photo-detector and an optical coupling device for coupling said incident light into said at least one light conducting fiber and for coupling light from said at least one light conducting fiber to said photo-detector;
    an optical filter means positioned in the light ray path between said at least one light conducting fiber and said photo-detector for analyzing the emitted light spectrum from said at least one measuring transducer, said optical filter means having filtering spectra dividing the emitted spectrum from said measuring transducer into at least three non-identical wavelength intervals;
    said photo-detector being adapted to measure the emitted light to measure the filtered emitted light from said optical filter means and generating detector signals in the respective wavelength intervals; and
    said evaluating unit further including means for multiplying the detector signals by constants including the constant unity, means for forming the difference between said detector signals multiplied by said constants, and means for forming the quotient therebetween.

2. A fiber optic measuring device according to claim 1, wherein the measured values are computed from the expression $$\frac{SI - \alpha SJ}{SK - \beta SL},$$

where SI, SJ, SK and SL constitute the detector signals after filtering with four filters having spectra FI($\lambda$), FJ($\lambda$), FK($\lambda$), and FL($\lambda$), respectively, where $\alpha$ and $\beta$ are constants, and where at least three of the signals SI, SJ, SK and SL are not identical.

3. A fiber optic measuring device according to claim 2, wherein the evaluating electronic unit includes a device for computing said constants $\alpha$ and $\beta$ from the detector signals when said photo-detectors include reflection filters which are spectrally neutral within said emission spectrum, and that said computation is arranged to be a quotient formation between said SI and SJ for $\alpha$, and between said SK and SL for $\beta$.

4. A fiber optic measuring device according to claim 1, wherein the measuring transducer includes a plurality of interference filters with at least two intermediate light modulators and that quantities to be measured influence the optical transmission by varying degrees in the different light modulators.

5. A fiber optic measuring device according to claim 1, wherein the emission spectrum has one or more peaks, and that said optical filter means is chosen so that the light emanating from said peaks may be separated for detection.

6. A fiber optic measuring device according to claim 1, wherein the response spectrum of the measuring transducer, in at least one wavelength interval of the emission spectrum, gives greater variations of the light emanating from the measuring transducer than in at least one other non-identical wavelength interval of the emission spectrum.

7. A fiber optic measuring device according to claim 6, wherein the response spectrum of the measuring transducer further includes at least one wavelength interval within the emission spectrum with a low value relative to the other wavelength intervals.

8. A fiber optic measuring device according to claim 1, wherein the response spectrum of the measuring transducer has a local minimum or maximum within the wavelength interval for the emission spectrum, and that the quantity to be measured is arranged to influence a characteristic of said minimum or maximum.

9. A fiber optic measuring device according to claim 4, wherein each of said interference filters has a reflection peak and that these peaks are positioned adjacent each other with respect to wavelength within said emission spectrum.

10. A fiber optic measuring device according to claim 1, wherein said optical filter means is a group of interference filters adapted to be moved relative to one another.

11. A fiber optic measuring device according to claim 1, wherein said optical filter means is a group of Fabry-Perot filters adapted to be moved with respect to one another.

12. A fiber optic measuring device according to claim 1, wherein said optical filter means is a group of enhanced transmission filters adapted to be moved with respect to one another.

13. A fiber optic measuring device according to claim 1, wherein said optical filter means is a group of double refraction filters adapted to be moved with respect to one another.

14. A fiber optic measuring device according to claim 1, wherein said optical filter means is a group of absorption filters adapted to be moved with respect to one another.

15. A fiber optic measuring device according to claim 1, wherein said optical filter means is an electro-optical filter and further comprising means for electrically modulating said electro-optical filter.

* * * * *